US011881958B2

(12) United States Patent
Rey et al.

(10) Patent No.: US 11,881,958 B2
(45) Date of Patent: Jan. 23, 2024

(54) SHARED VISUAL CONTENT FILTERING DURING VIRTUAL MEETINGS

(71) Applicant: Microsoft Technology Licensing, LLC, Redmond, WA (US)

(72) Inventors: Romain Gabriel Paul Rey, Vancouver (CA); Mastafa Hamza Foufa, Nimes (FR); Fernando Javier Yanez Lucero, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 17/444,647

(22) Filed: Aug. 6, 2021

(65) Prior Publication Data
US 2023/0042015 A1    Feb. 9, 2023

(51) Int. Cl.
| | | |
|---|---|---|
| H04L 12/18 | (2006.01) | |
| G06N 20/00 | (2019.01) | |
| G06F 3/0484 | (2022.01) | |
| H04L 51/212 | (2022.01) | |
| G06N 3/08 | (2023.01) | |
| H04N 7/15 | (2006.01) | |

(52) U.S. Cl.
CPC ........ H04L 12/1813 (2013.01); G06F 3/0484 (2013.01); G06N 20/00 (2019.01); *G06N 3/08* (2013.01); *H04L 51/212* (2022.05); *H04N 7/157* (2013.01)

(58) Field of Classification Search
CPC ... H04L 12/1813; H04N 7/157; G06F 3/0484; G06N 20/00; G09G 2358/00; G06Q 10/10
See application file for complete search history.

(56) References Cited

U.S. PATENT DOCUMENTS 9,141,332 B2    9/2015   Coleman et al.
9,361,469 B2    6/2016   Thiyagarajan et al.
(Continued)

OTHER PUBLICATIONS

Bhattacharjee, V, "How Content Classification Works in Microsoft 365", Retrieved from: https://www.proventeq.com/blog/how-content-classification-works-in-microsoft-365, Apr. 17, 2020, 3 Pages.
(Continued)

*Primary Examiner* — Tan H Tran
(74) *Attorney, Agent, or Firm* — Alleman Hall Creasman & Tuttle LLP

(57) ABSTRACT

A method for virtual meeting content sharing comprises, during a virtual meeting, receiving a request to share visual interface content including one or more visual content elements rendered by a client computing device with one or more remote participant devices. For each of the one or more visual content elements, an element feature vector is determined. Each of the one or more element feature vectors are sent to a remote meeting server. From the remote meeting server, an indication is received that a specified visual content element is flagged as potentially subject to filtering, based at least in part on a difference between (1) a meeting feature vector and (2) the element feature vector for the specified visual content exceeding a content filter threshold, the meeting feature vector quantifying a plurality of meeting context parameters of the virtual meeting.

19 Claims, 13 Drawing Sheets

(56) References Cited

U.S. PATENT DOCUMENTS

| | | |
|---|---|---|
| 9,398,059 B2 | 7/2016 | Shepherd et al. |
| 9,699,271 B2 | 7/2017 | Brander et al. |
| 10,678,566 B2 | 6/2020 | Bao et al. |
| 2011/0202850 A1* | 8/2011 | Chan .................... G06F 21/606 715/745 |
| 2011/0252366 A1* | 10/2011 | Balasubramanian .. G06Q 10/10 715/810 |
| 2015/0324553 A1 | 11/2015 | Furuichi et al. |
| 2016/0232456 A1 | 8/2016 | Jain et al. |
| 2016/0234276 A1* | 8/2016 | Ouyang ................. H04N 7/147 |
| 2018/0082068 A1* | 3/2018 | Lancioni ................ G06F 21/84 |
| 2018/0336373 A1 | 11/2018 | Deenadayal |
| 2019/0364001 A1* | 11/2019 | Dotan-Cohen ...... G06Q 10/107 |
| 2021/0048973 A1 | 2/2021 | Schwabacher et al. |
| 2022/0277435 A1* | 9/2022 | Muthusamy ........... G06V 30/41 |

OTHER PUBLICATIONS

"International Search Report and Written Opinion Issued in PCT Patent Application No. PCT/US22/032592", dated Sep. 15, 2022, 13 Pages.

\* cited by examiner

SHARED VISUAL CONTENT FILTERING DURING VIRTUAL MEETINGS

BACKGROUND

Virtual meetings can be facilitated by computing devices exchanging data (e.g., audio and/or video) over a computer network. During a virtual meeting, one or more computing devices may share visual content (e.g., one or more user interface windows) with any other computing devices participating in the virtual meeting.

DETAILED DESCRIPTION

Virtual meetings can facilitate real-time communication between two or more human video call participants via data exchanged between two or more different computing devices—e.g., audio data encoding human speech, and/or video data encoding one or more live video streams depicting one or more real-world environments. In this manner, the two or more human participants can communicate and collaborate over a suitable computer network (e.g., the Internet) even when the two or more human participants are physically remote from one another. Thus, as examples, a "virtual meeting" as used herein can refer to a business meeting, interview, educational session, social call, or any other scenario in which two or more different computing devices are used to enable remote communication between different human participants via exchange of digital audio and/or video.

During a virtual meeting, one computing device may initiate sharing of visual interface content currently rendered by the device with any or all other computing devices participating in the virtual meeting. For instance, a human meeting participant may choose to share one or more interface windows they are currently viewing with other participants in the meeting—e.g., for the purposes of explanation or collaboration. In general, shared visual interface content can include any graphical user interface (GUI) content currently being rendered by the computing device such as, for example, an operating system interface and/or one or more software application interfaces. It will be understood that such content may be shared regardless of whether it is currently being actively displayed by the computing device that initiates the sharing—e.g., a user may choose to share an interface window that they themselves currently have minimized.

Figure 1:
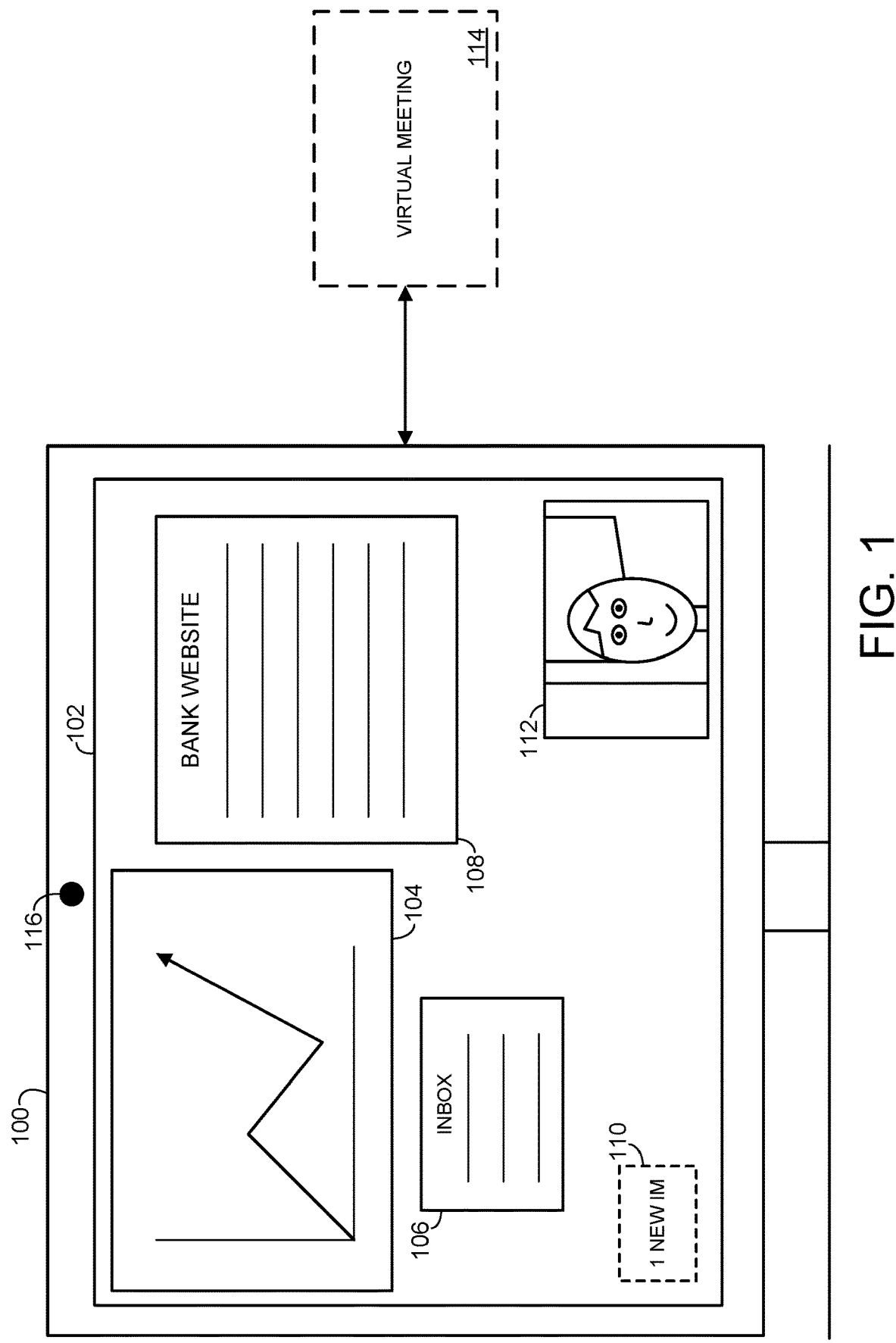
FIG. 1 schematically shows visual interface content rendered for display by a client computing device participating in a virtual meeting.

FIG. 1 schematically shows an example client computing device currently rendering interface content 102, to be shared in the context of a virtual meeting. In this example, the client computing device takes the form of a desktop computer displaying visual content via a computer monitor. It will be understood, however, that a "client computing device" may refer to any suitable device that can render visual interface content and share such content with other computing devices over a network. As non-limiting examples, a client computing device may take the form of a desktop computer, laptop, smartphone, tablet, or augmented/virtual reality device. In some examples, a client computing device may be implemented as computing system 1200 described below with respect to FIG. 12.

In FIG. 1, the interface content 102 is a GUI that includes a plurality of different visual content elements. These include meeting-related content 104, a messaging client inbox 106, a website 108 rendered by an internet browser, a displayed notification 110, and a video stream 112. The video stream is received during participation in a virtual meeting 114 with one or more remote participant devices, corresponding to one or more remote human meeting participants. It will be understood that the specific interface content shown in FIG. 1 is intended only as an example. In general, interface content can include virtually any visual content rendered by a computing device, including text, images, videos, application windows, user interface elements, operating system elements, etc.

As discussed above, virtual meeting 114 may be implemented via exchange of digital audio and/or video between various computing devices participating in the virtual meeting, enabling communication between the different human participants. As such, video stream 112 depicts a different human participant in the virtual meeting, captured by a camera and sent to client computing device 100 over a suitable computer network (e.g., the Internet). In some examples, the client computing device may transmit digital audio and/or video (e.g., captured via a camera 116, and/or other suitable integrated/external camera/microphone) corresponding to a human user of client computing device 100 to other computing devices participating in the virtual meeting. This may enable different human participants to replicate in-person communication even when they are located remotely from one another. It will be understood, however, than any or all computing devices in the virtual meeting may opt to refrain from sending audio and/or video to other devices, while still receiving data from other computing devices in the virtual meeting.

During the virtual meeting, a human user of client computing device 100 may choose to share some or all of interface content 102 with one or more remote computing devices. For example, the user may choose to share meeting-related content 104 for purposes of explanation or discussion with other human meeting participants. As another example, a different human participant in the virtual meeting may request that the client computing device begin sharing specified visual content (and this request may in some cases be subject to approval by the user of the client computing device). However, interface content 102 includes elements that the user may prefer not to share with others—e.g., their message inbox, their personal banking information, or their currently displayed notifications. While it may sometimes be possible for the user to manually select which interface content they would specifically like to share, this process can be confusing, tedious or subject to error. In any case, sharing interface content with other meeting participants has the potential to inadvertently reveal private or sensitive content that the user would prefer not to share.

Accordingly, the present disclosure is directed to techniques for virtual meeting content sharing in which visual content elements of shared interface content that are potentially sensitive can be automatically flagged. From there, the system can prompt the user to confirm which content elements they would like to share or hide, and/or the system can choose to obscure one or more visual content elements automatically. This beneficially reduces the risk that a human user will inadvertently share content that they would prefer to remain private, without requiring the user to explicitly (and accurately) indicate up-front which specific content elements they would like to share or hide.

Figure 2:
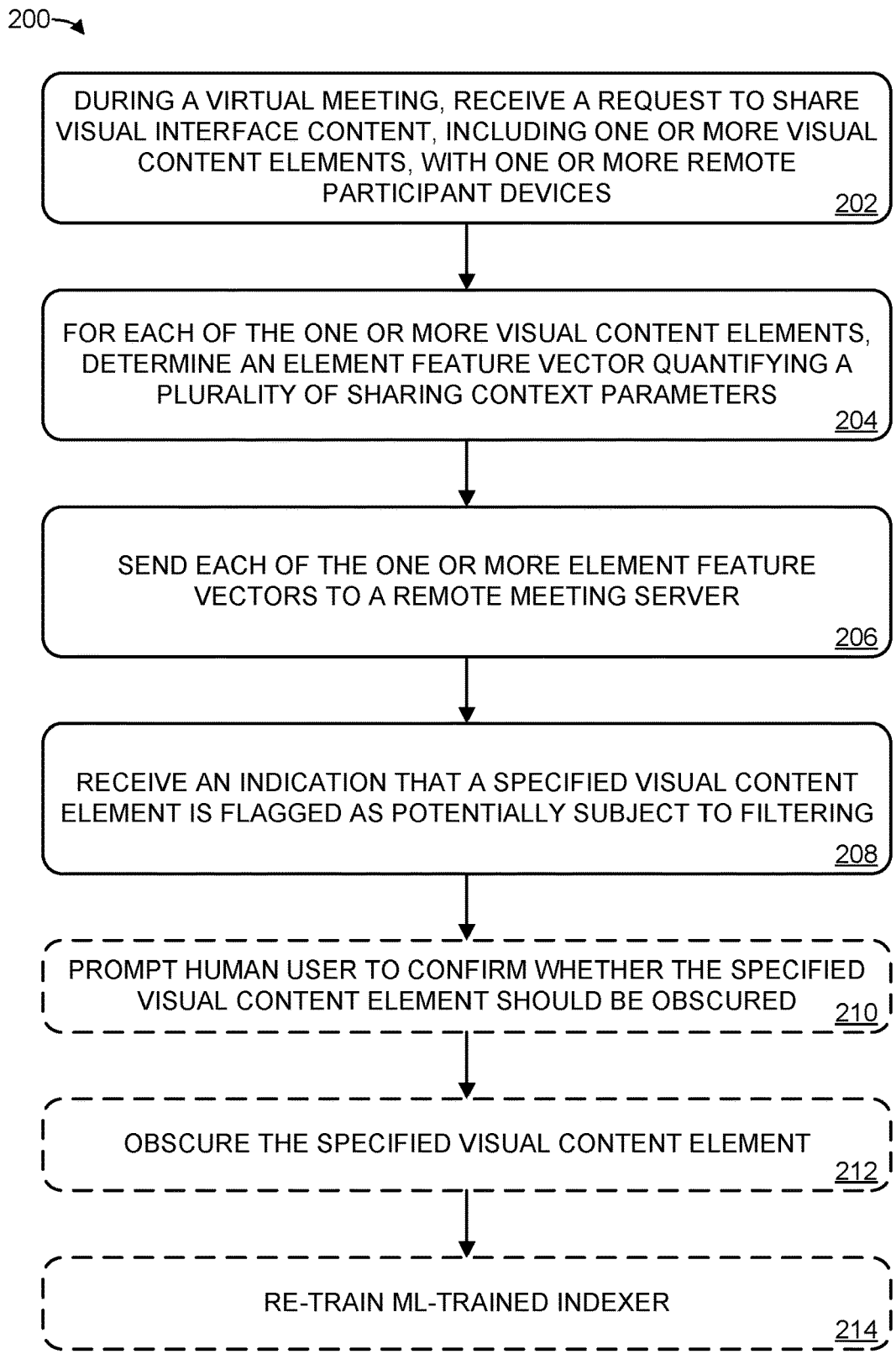
FIG. 2 illustrates an example method for virtual meeting content sharing.

FIG. 2 illustrates an example method 200 for virtual meeting content sharing. Method 200 may be implemented by any suitable computing system of one or more computing devices. Any computing devices implementing method 200 may each have any suitable capabilities, form factors, and hardware configurations. In various examples, method 200 may be implemented by client computing device 100 of FIG. 1, and/or computing system 1200 described below with respect to FIG. 12.

At 202, method 200 includes, during a virtual meeting, at a client computing device, receiving a request to share visual interface content rendered by the client computing device with one or more remote participant devices, the visual interface content including one or more visual content elements. In many cases, the request will be received by a human user of the client computing device, although the request could additionally or alternatively be received from an automated software process on the client computing device, and/or a remote participant device may request that the client computing device begin sharing content. For the purposes of the present disclosure, a "client computing device" is any particular computing device participating in a virtual meeting that shares visual content with any or all other computing devices in the meeting.

Furthermore, "visual interface content" includes any visual content rendered by a computing system that has been indicated for sharing with one or more remote computing devices. In many cases, sharing of interface content occurs after an explicit user input (e.g., activation of a "screen share" feature), although it will be understood that this is non-limiting. In other examples, sharing of interface content can be initiated automatically by a software application or operating system component, rather than in response to a user input. The amount of content shared can vary depending on the implementation and/or based on user request. For example, in various cases, the shared visual interface content can include the entire GUI rendered by the client computing device, any visual content currently displayed by the client computing device via one or more display devices (e.g., screens, projectors), or the shared content may be limited to one or more specific application windows.

As used herein, shared visual interface content includes one or more individual visual content elements. It will be understood that a "visual content element" can include any substituent component of the shared visual interface content. To reuse the example of FIG. 1, the shared visual interface content includes the entire interface 102 currently displayed by the client computing device (although the video stream 112 received from the remote meeting participant may be omitted from sharing) As non-limiting examples, visual content elements can include one or more software application windows (such as messaging inbox 106), tabs of an internet browser (such as bank website 108), and displayed notifications (such as notification 110). More generally, visual content elements can include images, videos, text, and/or arbitrary collections of pixels. It will be understood that, in a typical scenario, the shared visual interface content includes one or more visual content elements that the user intends to share with other meeting participants, though may additionally include visual content elements that the user would prefer not to share.

Furthermore, as discussed above, the visual interface content may be shared with one or more remote participant devices, taking the form of any or all other computing devices participating in the virtual meeting. Communication between the client computing device and remote participant devices is schematically illustrated with respect to FIG. 3. As shown, client computing device 100 is communicatively coupled with a computer network 102, which may take the form of any suitable local or remote network (e.g., the Internet). Via network 102, client computing device 100 exchanges data with a plurality of different remote participant devices 300, each of which corresponds to one or more human participants in the virtual meeting. The exchanged data can include digital audio data, digital video data, shared interface content, etc.

It will be understood that, in some cases, not all computing devices participating in the virtual meeting may be capable of displaying visual interface content. Such devices may, for example, lack physical displays, projection devices, or suitable output devices capable of rendering visual content. Similarly, some computing devices or human participants may opt not to receive and/or view shared interface content. Regardless, it will be understood that, in general, visual interface content shared by a client computing device may be sent to at least one remote participant device for viewing.

Figure 3:
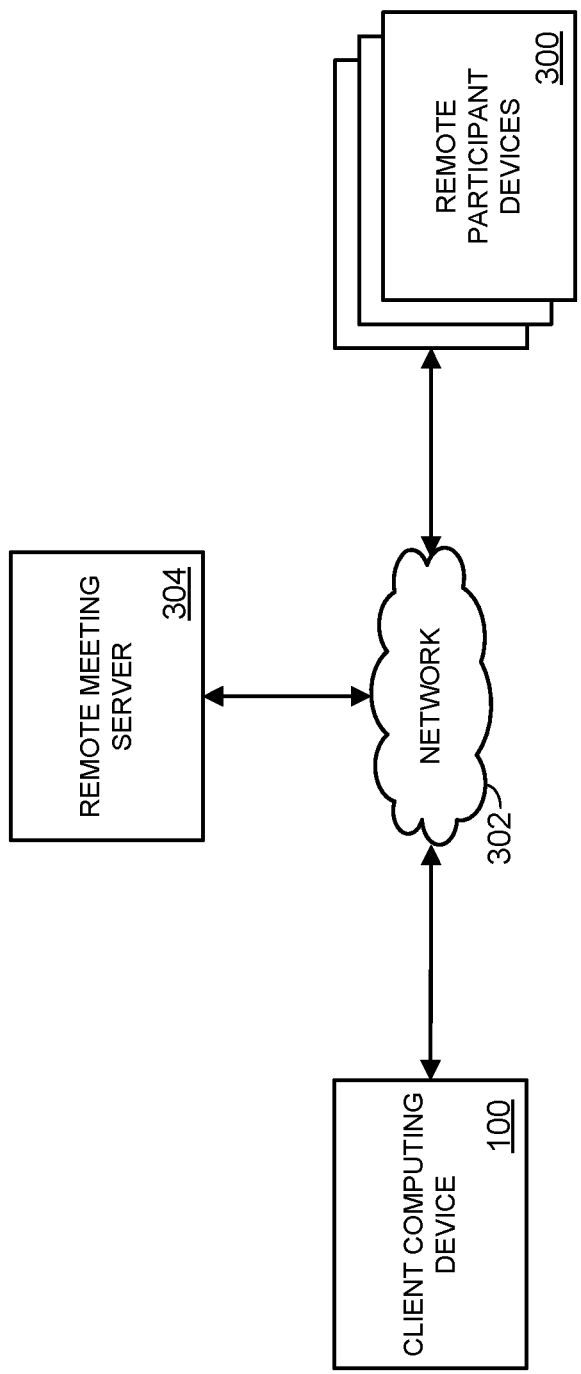
FIG. 3 schematically illustrates exchange of data between computing devices participating in a virtual meeting.

Furthermore, in FIG. 3, the client computing device and remote participant devices are each communicatively coupled with a remote meeting server 304. The remote meeting server may, for instance, be owned and/or operated by an organization that provides the software and/or technical infrastructure used to enable virtual meetings. The client computing device and/or remote participant devices may exchange any suitable data with the remote meeting server before, during, and after the virtual meeting. For instance, the remote meeting server may facilitate initial pairing between the client computing device and remote participant devices, enabling the virtual meeting to be established. As another example, and as will be described in more detail below, the remote meeting server may evaluate feature vectors corresponding to visual content elements and/or the virtual meeting itself, in order to determine whether any visual content elements should be flagged as potentially unsuitable for sharing.

Returning briefly to FIG. 2, at 204, method 200 includes, for each of the one or more visual content elements of the shared visual interface content, determining an element feature vector quantifying a plurality of sharing context parameters for the visual content element. In general, a "feature vector" can refer to a data structure that specifies a plurality of different values, corresponding to different dimensions of a feature space having a plurality of dimensions. For instance, each element feature vector may have a plurality of dimensional feature values that correspond to different sharing context parameters of each visual content element. In other words, for each sharing context parameter corresponding to the visual content element, the computing system may assign a dimensional feature value that corresponds to a dimension of the vector's feature space. An element feature vector can have any suitable number of dimensional feature values corresponding to any number of different sharing context parameters—e.g., the feature vector may specify dozens, hundreds, or thousands of different values.

This is schematically illustrated in FIG. 4, which again shows visual interface content 102 of FIG. 1, including elements 104, 106, 108, 110, and 112. For each of the visual content elements 104, 106, 108, and 110, the computing device determines a corresponding element feature vector 402. This may be done through use of a suitable machine-learning (ML) trained indexer 400, as will be described in more detail below. In this example, visual content element 112 is not assigned a corresponding element feature vector, as it is not a visual content element indicated for sharing with remote participant devices in the virtual meeting. Rather, as discussed above, visual content element 112 takes the form of a video stream that is streamed to the client computing device by another computing device in the virtual meeting.

The element feature vectors for the visual content elements of the shared visual interface content are determined based at least in part on a plurality of different sharing context parameters for each visual content element. As used herein, "sharing context parameters" can take the form of any suitable information available to the client computing device that may be relevant in determining whether the visual content element is suitable for sharing with other meeting participants. As non-limiting examples, for a particular visual content element, the plurality of sharing context parameters for the visual content element can include one or more text, images, or videos visible in the visual content element.

For instance, as discussed above, a visual content element can take the form of a single tab of an internet browser that a user currently has open on their desktop. The browser tab could potentially be relevant to the virtual meeting and thus intended by the user for sharing with other meeting participants, or the browser tab could potentially be something that the user would prefer not to be shared—e.g., because the tab includes personal banking information, health information, and/or other non-meeting-related content. Thus, for the purposes of determining whether the browser tab should be revealed or hidden in any visual interface content shared by the user, the client computing device may evaluate the contents of the browser tab—e.g., any text, images, or video—and express this evaluation as one or more different dimensional feature values for the element feature vector corresponding to the browser tab.

While the above example focuses specifically on a tab of an internet browser, it will be understood that this is non-limiting. Rather, the contents (e.g., text, images, videos) of any suitable visual content element can be evaluated and expressed as one or more dimensional feature values of an element feature vector. As additional non-limiting examples, such visual content elements can include documents open in a word processor or document viewer, media content open in a media player (e.g., photos, videos, song titles, artist names, album thumbnails), text or attachments of emails visible in an email inbox, active notifications (e.g., corresponding to incoming instant messages), video games (e.g., on-screen text, character models, rendered environments), desktop backgrounds, and/or any other visual content elements of any visual interface content indicated for sharing during a virtual meeting.

Additionally, or alternatively, the plurality of sharing context parameters for a visual content element can take other suitable forms. As another example, such sharing context parameters can include file metadata for a file open in a software application. For instance, during the virtual meeting, a user may have several different documents open in different windows rendered by a word processing application. These documents can include some that are relevant to the current meeting, and/or documents that are not relevant and that the user would prefer not to share—e.g., because they are for other work-related projects, notes, or personal documents.

In this example, the file metadata for each document can be useful in evaluating whether the document is potentially unsuitable for sharing with other devices in the virtual meeting. As non-limiting examples, the file metadata can include one or more of a data of creation of the file, a time or date the file was last read or edited, a number of times the file has previously been read or edited, identities of one or more individuals who have permission to access the file, and an average length of time the file is open. For instance, if one document was last edited during a virtual meeting conducted on the previous day, and the individuals who have permission to access the document are all participants in the virtual meeting, then it may be relatively likely that the document is safe to share as part of the shared visual interface content. By contrast, if the file was last opened after normal working hours, and only the user of the client computing device has permission to access the file, then it may be relatively more likely that the document is personal and not intended for sharing.

Additionally, or alternatively, other types of file metadata may be used as sharing context parameters for a visual content element. Such file metadata can include an indication of one or more geographic locations at which the file has previously been accessed, one or more internet protocol (IP) addresses of computing devices that have previously accessed the file, and an indication of one or more times-of-day at which the file has previously been accessed. For example, if the file is a document that is commonly accessed during working hours, from an IP address corresponding to a user's work computer, and from a geographic location corresponding to the user's office, then it may be relatively likely that the file is a work-related document appropriate for sharing in a work-related meeting. By contrast, if the file is a document commonly accessed outside of normal working hours, from the user's personal computer at the user's personal residence, then it may be relatively likely that the file is a personal document that is potentially unsuitable for sharing.

Again, the above example focused on visual content elements taking the form of documents open in a word processing application. It will be understood, however, that file metadata for any suitable type of computer file may be used. As non-limiting examples, such computer files can include documents, spreadsheets, presentation slides, images, videos, audio tracks, emails, etc.

Furthermore, in any scenario where file metadata, contents of a visual content element (such as images, text, videos), and/or any other sharing context parameters for a visual content element are evaluated by the client computing device, such evaluation may be done in a manner that preserves the user's digital privacy. For example, any analysis of a user's visual content element (e.g., contents, corresponding file metadata) may be strictly opt-in only, and/or such evaluation may be performed exclusively on the user's client computing device as opposed to outsourced to a remote server. In cases where data is sent to a remote server (e.g., after the user provides permission), then such data may be anonymized, encrypted, subject to retention limits, and/or the user's data privacy may be protected in any other suitable way.

It will be understood that the specific manner in which sharing context parameters of a visual content element are converted into dimensional feature values of a corresponding element feature vector can vary significantly depending on the specific type of visual content element, and the specific types of sharing context parameters considered. For example, in evaluating text visible in a content element, individual words may be assigned numerical values by an ML-trained indexer, where words having similar meanings (e.g., synonyms) are assigned relatively similar values, and words having different meanings (e.g., antonyms) are assigned relatively different values. As another example, for images in a visual content element depicting human faces, facial analysis or recognition can be performed to evaluate the extent to which a face visible in one content element matches a face visible in another content element, and/or matches the face of a human participant in the virtual meeting. Similarly, file metadata such as the time of day at which a computer file is typically accessed, and/or the date at which the computer file was created, can be converted into a number such that files having similar properties are assigned similar numbers. It will be understood that, given the wide variety of different types of visual content elements that can potentially be shared during a virtual meeting, and the different types of information that may be available for such content elements, the manner in which sharing context parameters are converted into dimensional feature values can vary significantly depending on the implementation.

Figure 4:
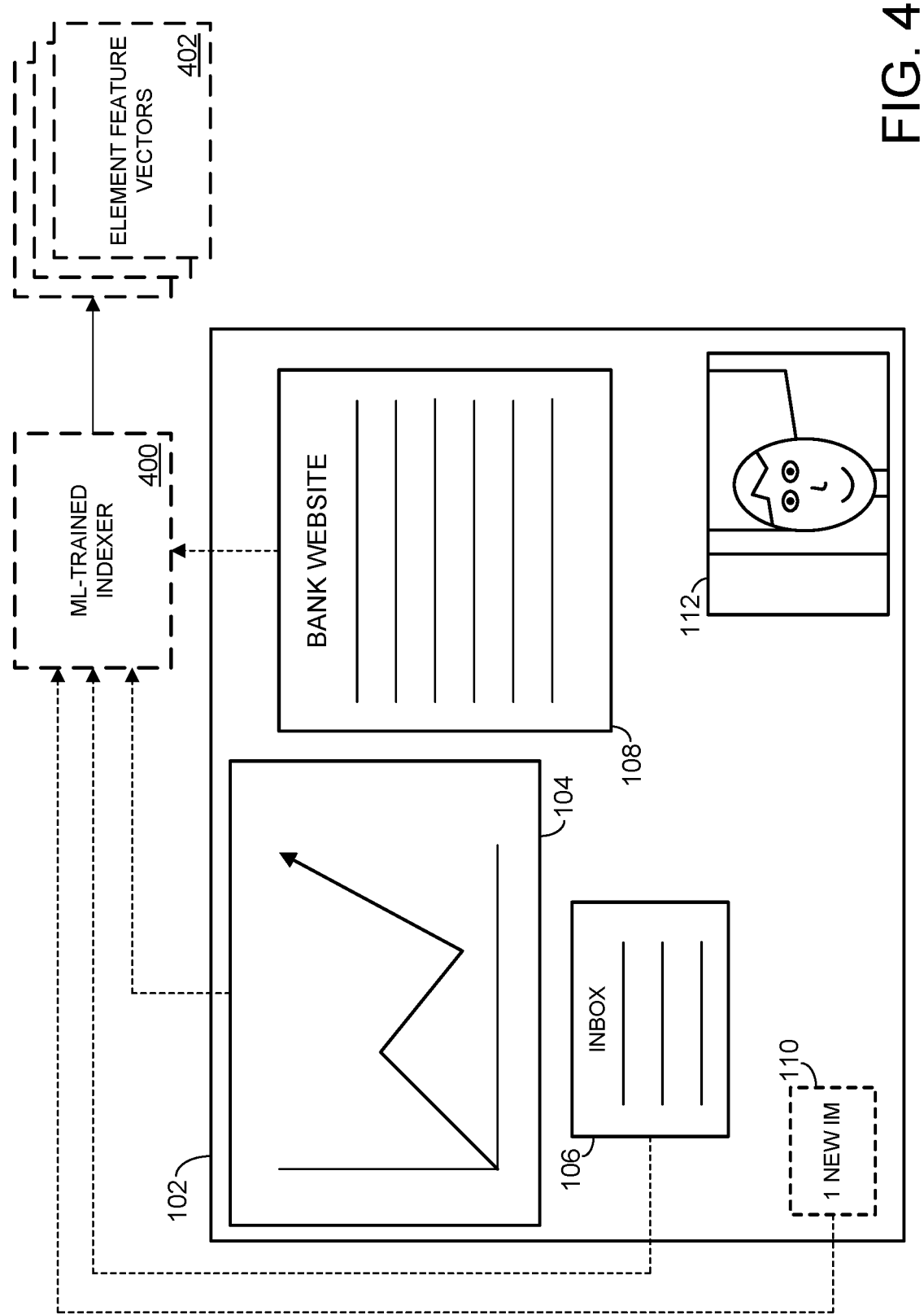
FIG. 4 schematically illustrates determining element feature vectors for visual content elements rendered by a client computing device.

In some cases, the one or more element feature vectors corresponding to the one or more visual content elements of the shared visual interface content are assigned by an ML-trained indexer—e.g., ML-trained indexer 400 of FIG. 4. For example, the ML-trained indexer may be previously trained to quantify each of the plurality of sharing context parameters for each visual content element as separate dimensional feature values for each of the one or more element feature vectors, relative to a feature space having a plurality of dimensions.

The ML-trained indexer may be implemented via any suitable ML and/or artificial intelligence (AI) technologies. In one example, the ML-trained indexer can be implemented as, or include, a natural language processing (NLP) model, such as a convolutional neural network (CNN). In general, however, the ML-trained indexer is configured to quantify the plurality of sharing context parameters as dimensional feature values for the element feature vector, and this may be done in any suitable way, using any suitable ML and/or AI approaches. Furthermore, it will be understood that any functions described herein as being performed by the "ML-trained indexer" may in some cases be performed by two or more separate ML and/or AI algorithms, classifiers, networks, etc., working independently or cooperatively.

Figure 5:
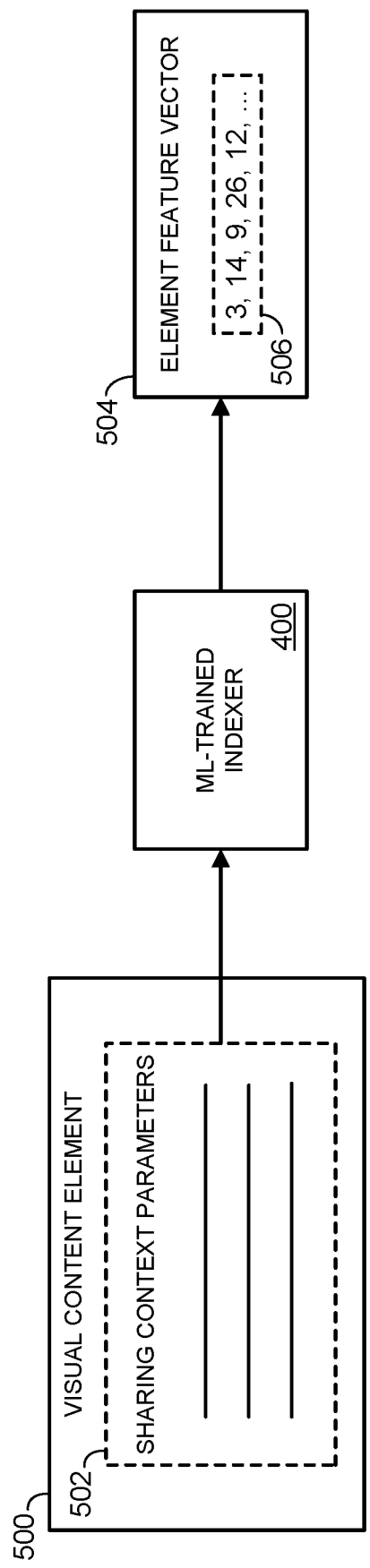
FIG. 5 schematically illustrates a machine-learning (ML) trained indexer determining an element feature vector for a visual content element.

This process is schematically illustrated with respect to FIG. 5. Specifically, an example visual content element 500 (which can take the form of any number of different types of visual content rendered by the client computing device, as discussed above) is associated with a plurality of sharing context parameters 502—e.g., file metadata, or text/images/videos in the visual content element. These sharing context parameters are provided to ML-trained indexer 400, which outputs a corresponding element feature vector 504. The element feature vector includes a plurality of separate dimensional feature values 506, corresponding to different dimensions of a feature space for the feature vector.

In the example of FIG. 5, the dimensional feature values of the feature vector are positive integer values. It will be understood, however, that this is only a non-limiting example. In other cases, the dimensional feature values can include negative values and/or non-integer values. Furthermore, the dimensional feature values may be limited to any suitable range. For example, the dimensional feature values can range between 0 and 1, 0 and 100, −1000 and +1000, etc., depending on the implementation.

As discussed above, each dimensional feature value for the element feature vector corresponds to a different dimension in the feature space of the element feature vector, where the feature space can include any suitable number of different dimensions (e.g., dozens, hundreds, thousands). Generally, the same dimension in the feature space may correspond to the same sharing context parameter for different visual content elements. For example, one particular dimension of the feature space may correspond to the typical times-of-day at which a file corresponding to a visual content element is accessed. Files that tend to be accessed at similar times may therefore tend to be represented by element feature vectors having values corresponding to the particular dimension that are relatively similar. In this manner, the extent to which two different element feature vectors are similar within the feature space can be a reflection of underlying similarities between the visual content elements corresponding to the element feature vectors. In other words, each of the element feature vectors may use a same schema, with different dimensional feature values corresponding to different pre-defined fields.

It will be understood that, in some cases, not every feature element vector will have the same number of dimensional feature values, or include values corresponding to every dimension of the feature space. For example, visual content elements that take the form of files open in a software application (e.g., documents, pictures, videos) may have corresponding metadata that indicates when the file was most recently edited, while a different visual content element taking the form of a tab of an internet browser may lack such metadata, as the browser tab is a different type of interface element from the open computer files. Given this, there may be some sharing context parameters, and therefore dimensions within the vector feature space, that are used for element feature vectors representing the open computer files (such as a date of last edit) and not used for the element feature vector corresponding to the browser tab. In such examples, any unused dimensions may simply be assigned a null value (e.g., zero), or simply omit a value entirely.

Furthermore, while each element feature vector may initially have a relatively large number of different dimensional feature values (e.g., thousands), this can complicate downstream processing, requiring a greater expenditure of computational power to perform vector comparisons as will be described in more detail below. Accordingly, in some examples, suitable dimensionality reduction techniques can be used to reduce the number of dimensions used by each element feature vector—e.g., dimensions on the order of several thousand can be reduced to several hundred. Dimensionality reduction can also mitigate the effects of sparse data—e.g., vectors that lack dimensional feature values for various sharing context parameters. Any suitable linear or non-linear techniques for dimensionality reduction can be used—e.g., principal component analysis or generalized discriminant analysis.

Furthermore, as will be described in more detail below, element feature vectors determined for visual content elements may in some cases be transmitted to a remote meeting server for processing. In such cases, dimensionality reduction may be performed either before or after transmission to the remote meeting server—e.g., dimensionality reduction may be performed by the client computing device and/or by the remote meeting server. Outsourcing dimensionality reduction to the remote meeting server can beneficially preserve computational processing resources of the client computing device.

In general, different element feature vectors may be assigned to each of the visual content elements of the shared visual interface content. As discussed above, the relative similarities or differences between the different element feature vectors within the feature space can be a reflection of underlying similarities or differences between the visual content elements—e.g., files that are accessed at similar times, shared with similar users, or include similar text will tend to be represented as feature vectors that are relatively more similar. In some examples, relative similarities or differences between element feature vectors can be used to assign the vectors to different sharing-related virtual domains—e.g., some elements may be classified as belonging to a "work" domain and may therefore potentially be safe for sharing in a work-related virtual meeting. By contrast, other elements may be classified as belonging to a "personal" domain and may therefore potentially be subject to filtering from the shared visual interface content. To this end, in some cases, the ML-trained indexer may be configured to assign the one or more element feature vectors to one or more different vector clusters corresponding to one or more different sharing-related virtual domains.

Figure 6:
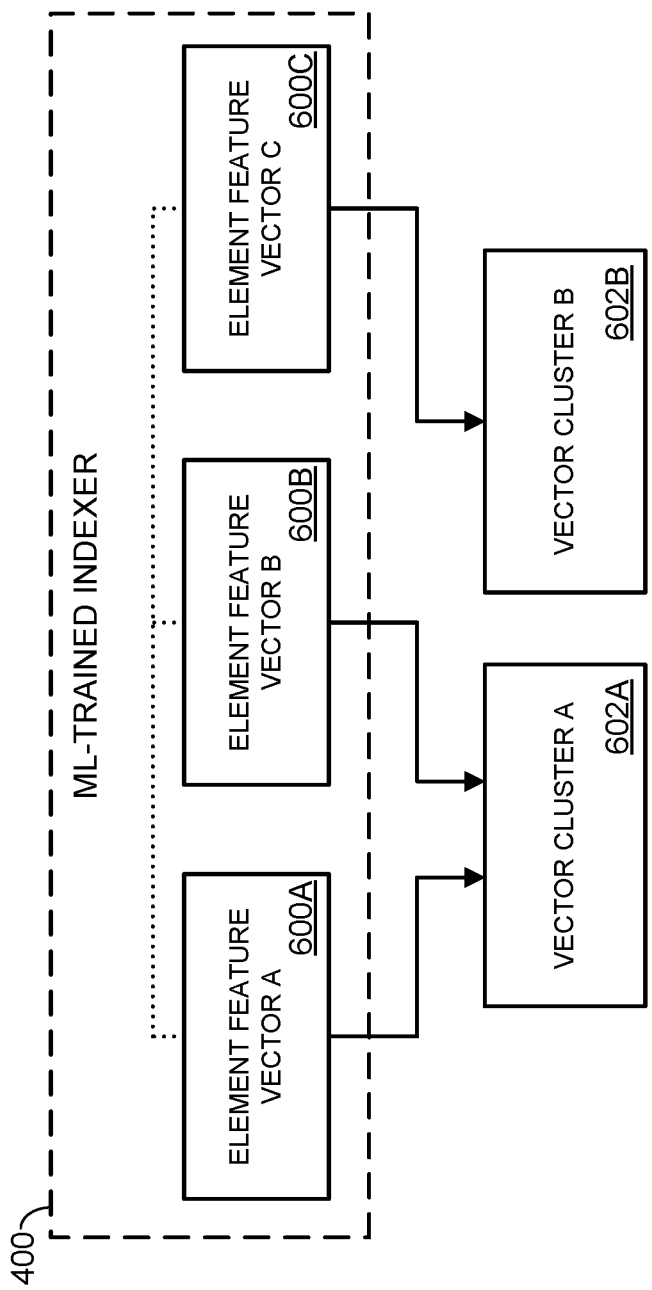
FIG. 6 schematically illustrates assigning element feature vectors to different vector clusters corresponding to different sharing-related virtual domains.

This is schematically illustrated with respect to FIG. 6, again showing ML-trained indexer 400. In this example, the ML-trained indexer is assigning different element feature vectors 600A, 600B, and 600C to different vector clusters 602A and 602B. Such assignment is done on the basis of similarity comparisons between the different element feature vectors, as indicated by the dashed lines extending between the different feature vectors. As shown, element feature vectors 600A and 600B are each assigned to vector cluster 602A (e.g., corresponding to a "work" virtual domain), while feature vector 600C is assigned to vector cluster 602B (e.g., corresponding to a "personal" virtual domain). For example, the element feature vectors 600A and 600B may be determined to have greater than a threshold similarity for purposes of cluster assignment (e.g., because they share similar dimensional feature values corresponding to similar sharing context parameters), while vector 600C is more distinct and is therefore assigned to a different vector cluster.

It will be understood that the specific sharing-related virtual domains discussed above (e.g., "work" and "personal") are non-limiting examples. In general, element feature vectors may be assigned to any number of different domains, corresponding to any variety of different ways in which visual content elements can be categorized. For example, different virtual domains can correspond to different projects at work, different jobs held by the same user, different types of personal content the user may access (e.g., health-related, family-related, finance-related, entertainment-related), etc. Furthermore, it will be understood that different sharing-related virtual domains need not have explicit human-readable names such as "work" or "personal," but rather can correspond to any grouping or clustering of different element feature vectors that can share any number of different potential similarities.

Furthermore, in some examples, different virtual clusters (and therefore different virtual domains) can have a hierarchical relationship. For example, within the "work" sharing-related virtual domain, the computing device can identify one or more sub-domains corresponding to different jobs held by the user, different ongoing projects at a single job, different teams or committees that they are a member of, etc.

Assigning element feature vectors to different vector clusters, and therefore different sharing-related virtual domains, can be done in various suitable ways. In general, such assignment may be done by the ML-trained indexer, which is previously trained to assign element feature vectors to different vector clusters based on relative similarity. This can be done via either or both of unsupervised training and supervised training.

In one non-limiting example, the machine-learning trained indexer may be trained to assign the one or more element feature vectors to one or more different vector clusters via unsupervised training using k-means clustering. In other words, for an arbitrary set of vectors, the ML-trained indexer may be configured to partition the vectors into an arbitrary set of clusters, where each vector is assigned to the cluster having the most similar mean (or centroid). The initial set of clusters may be built by the ML-trained indexer, accepted as an input parameter (e.g., specified by the user), or derived from existing information available to the system (e.g., different folders into which the user has manually sorted different computer files can be used as a starting point for identifying clusters). In some cases, k-means clustering can be implemented in tandem with suitable Gaussian mixture models to output, for each vector, a probability of membership in one or more different vector clusters, and assignment into different virtual domains can be done on this basis.

Additionally, or alternatively, the ML-trained indexer may be trained to assign the one or more element feature vectors to one or more different vector clusters via supervised training. For example, as will be described in more detail below, the ML-trained indexer can record inputs from the human user indicating which visual content elements should be filtered in different contexts. Based on such inputs, the ML-trained indexer can determine, for example, that the user frequently shares certain visual content elements in certain contexts while hiding other visual content elements, and assign visual content elements to different sharing-related virtual domains on this basis. Similarly, the human user can be prompted (e.g., prior to their first virtual meeting) to indicate which applications and/or computer files they often intend to share in different types of virtual meetings (e.g., corresponding to different topics, times-of-day, invited participants). As another example, as discussed above, the computer folders into which different computer files are sorted can be used as a basis for identifying which sharing-related virtual domains different visual content elements should be assigned to—e.g., documents in a "work projects" folder can be assigned to a "work" domain, while documents in the "finance" folder can be assigned to a "personal" domain. In general, any suitable input from a human user can be used in supervised training of the ML-trained indexer.

As will be described in more detail below, common membership in a same sharing-related virtual domain can be considered in determining whether a particular visual content element should be filtered or obscured in the shared visual interface content. For example, for a specified visual content element that has been flagged as potentially subject to filtering, the human user may be prompted to confirm whether the visual content element should in fact be hidden. If the user instructs the client computing device to hide or obscure the specified visual content element in some way, then any other visual content elements belonging to the same sharing-related virtual domain as the specified visual content element can be handled in the same way. For example, based at least in part on the specified visual content element being obscured in the shared visual interface content (e.g., automatically, or in response to user request), any other visual content elements in the one or more visual content elements assigned to the same sharing-related virtual domain as the specified visual content element may be automatically obscured.

As discussed above, in some examples, the element feature vectors determined for the one or more visual content elements of the shared visual interface content can be transmitted to a remote meeting server (e.g., remote meeting server 304 of FIG. 3). Accordingly, returning briefly to FIG. 2, at 206, method 200 includes sending each of the one or more element feature vectors to a remote meeting server. The remote meeting server may then perform various operations to compare the element feature vectors to one another and/or a meeting feature vector that characterizes aspects of the ongoing virtual meeting. In this manner, the remote meeting server may determine whether any visual content elements are potentially subject to filtering.

The present disclosure primarily focuses on this scenario, in which the element feature vectors are determined at the client computing device, then transmitted to the remote meeting server for processing. This may beneficially conserve processing resources of the client computing device by outsourcing computationally expensive vector comparison operations to the remote meeting server. Furthermore, this approach preserves the privacy of the human user of the client computing device, as any potentially revealing data (e.g., file metadata) is converted at the client computing device into a feature vector from which it is impossible to extract such information before it is transmitted to the remote meeting server.

It will be understood, however, that the techniques described herein can use any suitable division of labor between the client computing device and remote meeting server. In some examples, substantially all of the techniques described herein may be performed by the client computing device without involving the remote meeting server. In other examples, any or all of the steps described above as being performed by the client computing device may instead be performed by the remote meeting server. For example, rather than determining the element feature vectors at the client computing device, the sharing context parameters for the visual content elements can be transmitted to the remote meeting server, which may determine the element feature vectors instead of the client computing device. As another example, assigning different element feature vectors to different vector clusters as described above can be done at either or both of the client computing device and remote meeting server. Furthermore, dimensional reduction of the dimensions used by the element feature vectors may be performed at either or both of the client computing device and remote meeting server, as discussed above.

Continuing with FIG. 2, at 208, method 200 includes receiving an indication from the remote meeting server that a specified visual content element of the one or more visual content elements is flagged as potentially subject to filtering. As will be described in more detail below with respect to FIGS. 10, 11A, and 11B, the remote meeting server may flag the specified visual content element based at least in part on a difference between (1) a meeting feature vector and (2) the element feature vector for the specified visual content exceeding a content filter threshold, where the meeting feature vector quantifies a plurality of meeting context parameters of the virtual meeting. In general, however, it will be understood that the remote meeting server may perform one or more operations to flag the specified visual content element as potentially subject to filtering, and send a corresponding indication to the client computing device. Furthermore, as will be discussed in more detail below with respect to FIGS. 10, 11A, and 11B, any suitable techniques can be used to assess the relative similarity or dissimilarity between two vectors.

Figure 7:
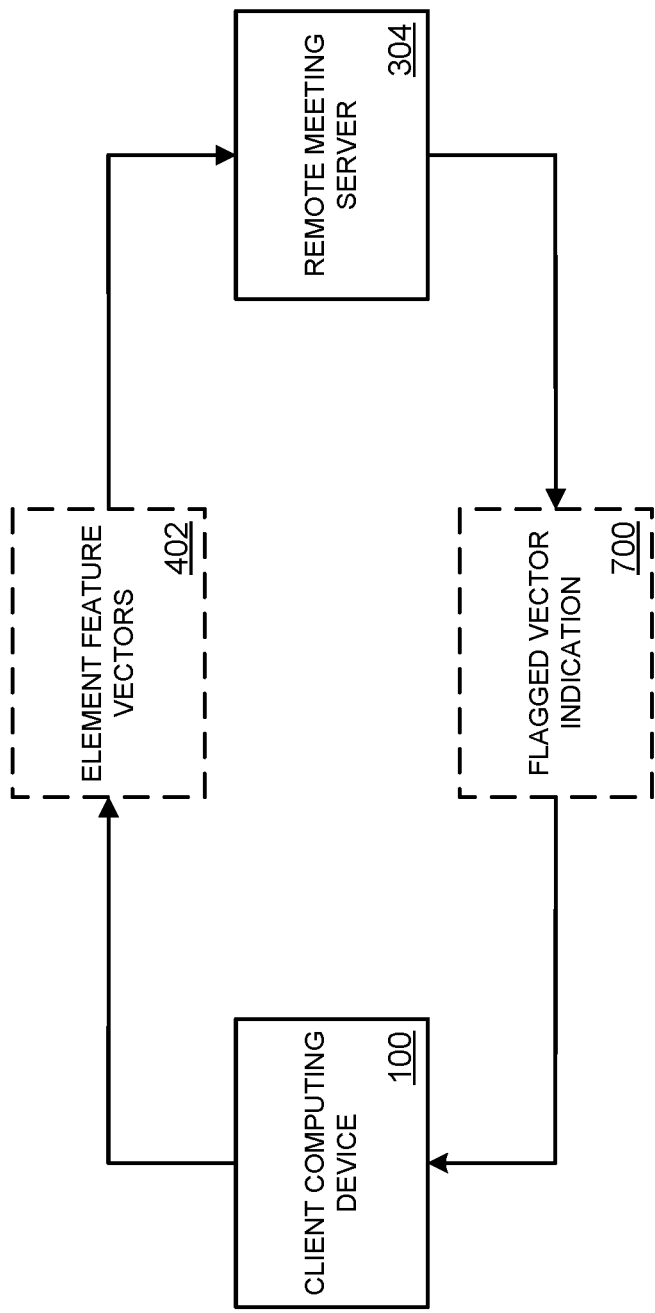
FIG. 7 schematically illustrates sending element feature vectors to a remote server device.

This is schematically illustrated with respect to FIG. 7. As shown, client computing device 100 sends a plurality of element feature vectors 402 (e.g., determined for one or more visual content elements as described above) to remote server device 304 over a suitable computer network, such as the Internet. In return, the client computing device receives a flagged vector indication 700, indicating that a specified visual content element of the one or more visual content elements is flagged as potentially subject to filtering.

The flagged vector indication may take any suitable form. In some cases, the remote meeting server may transmit indications for each of the element feature vectors originally transmitted to the remote meeting server, where each indication includes a binary bit specifying whether the corresponding element feature vector is flagged as potentially subject to filtering. In other cases, the remote meeting server may only send indications to the client computing device corresponding to element feature vectors that have been flagged. For example, if the client computing device transmits an element feature vector to the remote meeting server and does not receive a corresponding indication that the vector is flagged, the client computing device may assume that the visual content element corresponding to the element feature vector is safe to share as part of the shared visual interface content. As another example, the client computing device may receive a single indication from the remote meeting server that includes the status of each element feature vector sent to the remote meeting server (e.g., whether such vectors are flagged or not), or the single indication may only include a list of the element feature vectors that are flagged. In general, the client computing device receives some indication from the remote meeting server that a specified visual content element is flagged as potentially subject to filtering, and this indication can take any suitable form.

The client computing device may handle receiving such an indication in various suitable ways. Accordingly, returning briefly to FIG. 2, method 200 optionally includes, at 210, for the specified visual content element, prompting a human user of the client computing device to confirm whether the specified visual content element should be obscured in the shared visual interface content. Upon user confirmation, the specified visual content may be obscured in the shared visual interface content.

This is schematically illustrated with respect to FIG. 8, again showing shared visual interface content 102, including visual content elements 104, 106, 108, 110, and 112. In this example, elements 106, 108, and 110 have been flagged by the remote meeting server as potentially subject to filtering. Accordingly, in FIG. 8, the client computing device displays a prompt 800 asking the user to confirm whether the specified visual content elements should be obscured in the shared visual interface content. The user may confirm that each of the specified elements should be hidden, or alternately specify which of the indicated elements should be hidden on a case-by-case basis.

Figure 8:
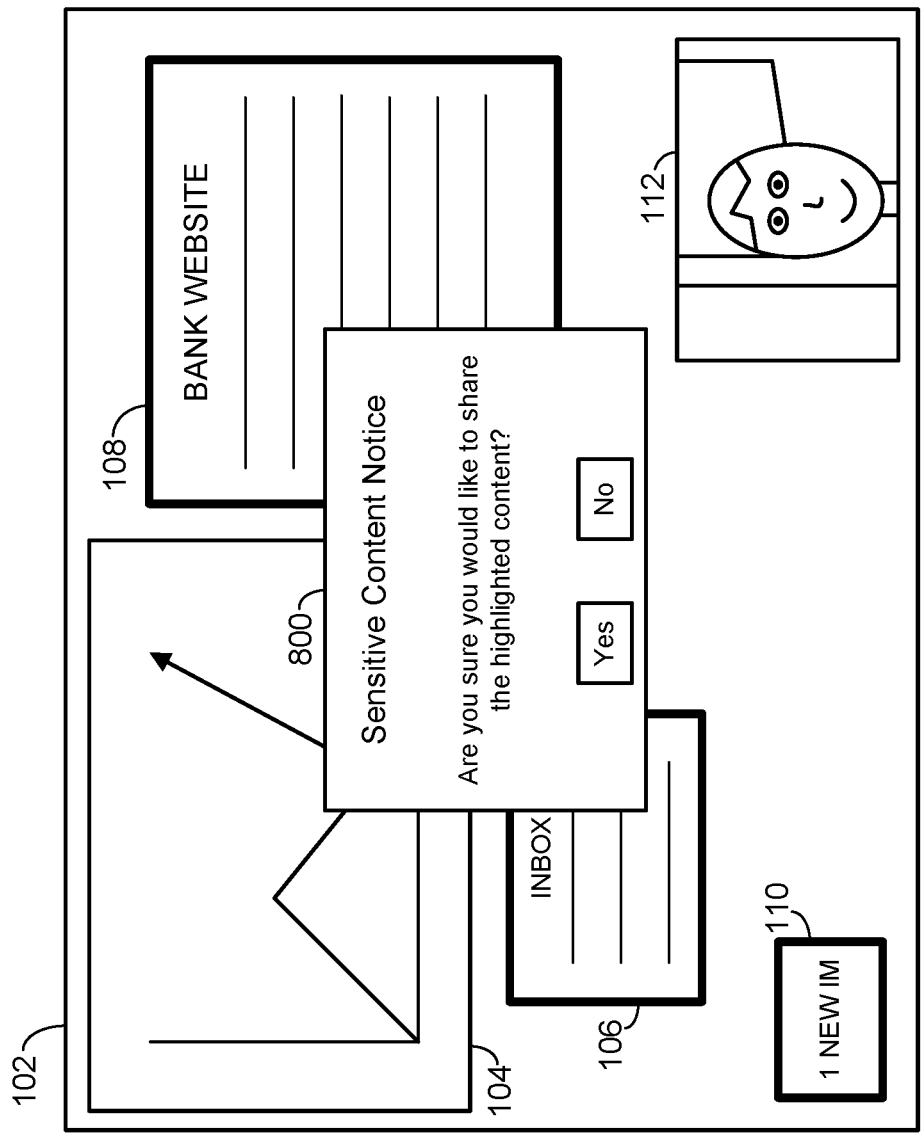
FIGS. 8 and 9 schematically illustrate obscuring visual content elements of shared visual interface content.

It will be understood, however, that the specific user interface elements shown in FIG. 8, including prompt 800, are non-limiting examples. In general, the client computing device may prompt the human user to confirm which flagged visual content elements should be obscured in any suitable way—e.g., by asking the user to confirm every flagged element as a batch, or asking the user to individually confirm for one or more different distinct visual content elements.

Returning briefly to FIG. 2, method 200 optionally includes, at 212, obscuring the specified visual content. This may be done after the user confirms which visual content elements flagged by the remote meeting server should be obscured—e.g., by interacting with prompt 800 of FIG. 8. Additionally, or alternatively, the client computing device may automatically obscure any or all visual content elements in the shared visual interface content that were flagged by the remote meeting server. In some examples, the client computing device may prompt the user to confirm whether some visual content elements should be hidden, while automatically obscuring other visual content elements.

For example, the client computing device may receive, from the remote meeting server, an indication that a second specified visual content element of the one or more visual content elements is flagged for automatic filtering. As will be discussed in more detail below, the remote meeting server may flag visual content elements for automatic filtering based at least in part on a difference between (1) a meeting feature vector and (2) the element feature vector for the second specified visual content exceeding an automatic filtering threshold. Notably, the automatic filtering threshold may be higher than a content filter threshold used for flagging visual content elements as potentially subject to filtering. Upon receiving an indication that a specified visual content element is flagged for automatic filtering, the client computing device may automatically obscure the specified visual content element in the shared visual interface content.

Thus, in various examples, after receiving an indication that one or more visual content elements are flagged, the client computing device may prompt the human user to confirm whether such elements should be obscured, and/or automatically obscure one or more visual content elements. As such, in performing steps of method 200, the client computing device may perform one, both, or neither of steps 210 and 212 depending on the implementation and depending on user preferences—e.g., the user may prefer that the client computing device automatically hide all flagged visual content elements, prompt the user to confirm before hiding any elements, or automatically hide elements meeting some criteria and not others.

Furthermore, as discussed above, different visual content elements may in some cases be assigned to different vector clusters, corresponding to different sharing-related virtual domains, by either or both of the client computing device and remote meeting server. Shared membership in a same virtual domain can be considered during obscuring visual content elements of the shared interface content. For example, based at least in part on a particular visual content element being obscured (e.g., automatically or in response to user confirmation), the client computing device may automatically obscure any other visual content elements in the same sharing-related virtual domain. In this manner, upon receiving an indication that a particular visual content element assigned to a "personal" virtual domain should be hidden, the client computing device may automatically obscure any other visual content elements also corresponding to the "personal" virtual domain.

Returning briefly to FIG. 2, at 214, method 200 optionally includes re-training the ML-trained indexer. As discussed above, the ML-trained indexer may be trained to determine element feature vectors for visual content elements, and/or assign element feature vectors to different vector clusters, based at least in part on supervised training. For example, upon prompting a user to confirm whether one or more specified visual content elements should be obscured, the user's responses can be tracked and used for training and/or re-training the ML-trained indexer. For example, a visual content element that is flagged as potentially subject to filtering may be approved for sharing by the user, and/or one or more elements that were not flagged may be manually selected for filtering by the user. In either case, the user's inputs can be recorded and affect the behavior of the ML-trained indexer in the future—e.g., by assigning different element feature vectors to visual content elements, and/or by assigning element feature vectors to different vector clusters.

Figure 9:
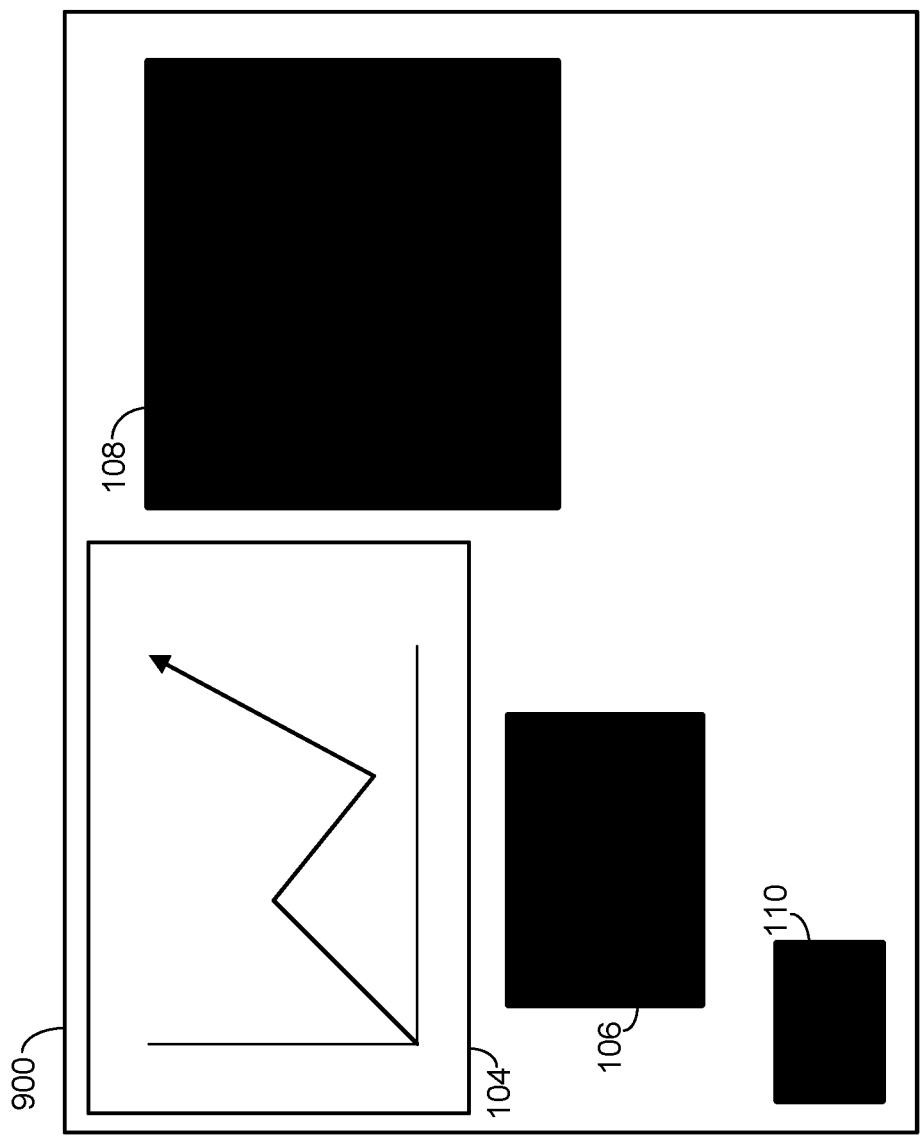

FIG. 9 schematically shows another example interface 900, after several visual content elements of shared visual interface content 102 have been obscured. Specifically, interface 900 includes interface content delivered to a remote meeting participant after visual content elements 106, 108, and 110 have been obscured, while meeting-related content 104 is still visible. The hidden visual content elements may be filtered automatically, and/or based on user confirmation as discussed above.

In the example of FIG. 9, the obscured visual content elements are blacked out. In other words, in some examples, obscuring the specified visual content element in the shared visual interface content can include blacking out the specified visual content element. It will be understood, however, that this is non-limiting, and that visual content elements can be obscured in any suitable way. As another non-limiting example, obscuring the specified visual content element in the shared visual interface content can include blurring the specified visual content element.

Figure 10:
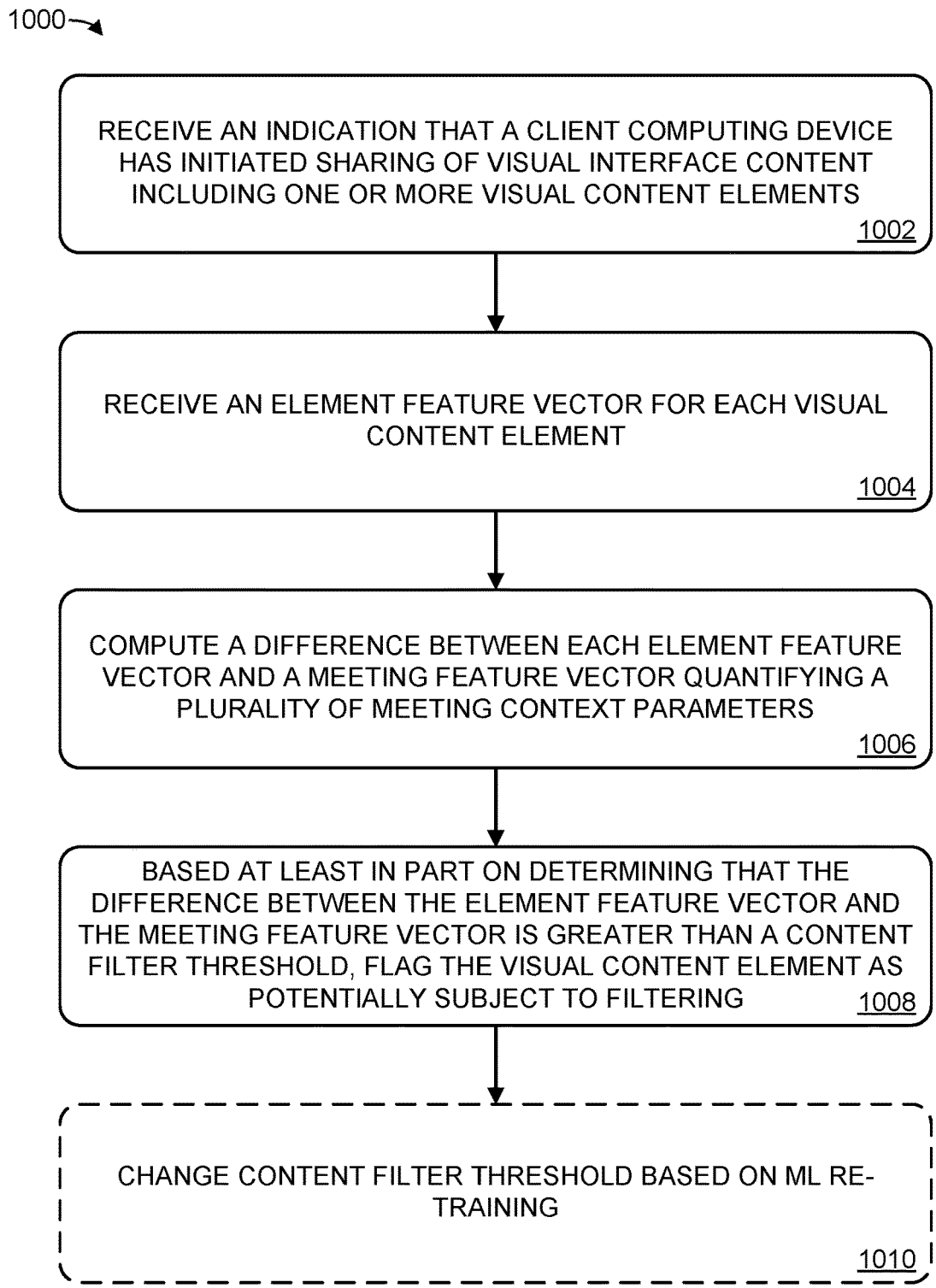
FIG. 10 illustrates an example method for virtual meeting content sharing.

As discussed above, flagging of visual content elements may be performed after corresponding element feature vectors are transmitted to a remote meeting server. Accordingly, FIG. 10 illustrates an example method for virtual meeting content sharing, including steps that may be performed by a remote meeting server (e.g., remote meeting server 304). However, it will be understood that any or all steps of method 1000 may in some cases be performed by the client computing device in addition to, or instead of, the remote meeting server. Furthermore, one or more steps of method 200 described above with respect to FIG. 2 may be performed by the remote meeting server in addition to, or instead of, the client computing device. For instance, in some cases, substantially all of the techniques described herein may be performed by a single device, such as the client computing device.

In general, method 1000 may be implemented by any suitable computing system of one or more computing devices. Any computing devices implementing method 1000 may each have any suitable capabilities, form factors, and hardware configurations. In various examples, method 1000 may be implemented by client computing device 100 of FIG. 1, remote meeting server 304 of FIG. 3, and/or computing system 1200 described below with respect to FIG. 12.

At 1002, method 1000 includes, during a virtual meeting, receiving an indication that a client computing device participating in the virtual meeting has initiated sharing of visual interface content rendered by the client computing device with one or more remote participant devices, the visual interface content including one or more visual content elements. As discussed above with respect to FIG. 3, the client computing device and/or remote participant devices may exchange data with remote meeting server 304 during the virtual meeting. Such information can include, for example, an indication that one participant device is initiating sharing of visual interface content with other devices participating in the virtual meeting.

Continuing with method 1000, at 1004, the method includes receiving, for each of the one or more visual content elements of the shared visual interface, an element feature vector quantifying a plurality of sharing context parameters for the visual content element. As discussed above, each element feature vector includes a plurality of different dimensional feature corresponding to the plurality of sharing context parameters for the visual content element. Notably, in some cases, receiving element feature vectors from the client computing device may serve as the indication that the client computing device has initiated sharing of visual interface content. In other words, depending on the implementation, the remote meeting server need not necessarily receive a separate indication from the client computing device that sharing of visual interface content has been initiated, but rather may simply receive element feature vectors when the client computing device initiates sharing.

Continuing with method 1000, at 1006, the method includes, for each visual content element, computing a difference between the element feature vector and a meeting feature vector quantifying a plurality of meeting context parameters of the virtual meeting. In general, just as the element feature vectors characterize different sharing context parameters of the different visual content elements, the meeting feature vector characterizes different meeting context parameters of the virtual meeting itself. Thus, the meeting feature vector may be output by a ML-trained indexer or real-time meeting controller that uses any suitable combination of AI and/or ML techniques, trained in any suitable way. Non-limiting examples of suitable AI and ML techniques, and training procedures, will be described in more detail below with respect to FIG. 12.

In general, the meeting feature vector may be expressed relative to the same feature space as the one or more element feature vectors. This may enable comparisons between the meeting feature vector and element feature vectors, as will be described in more detail below. Given this, the dimensional feature values of the meeting feature vector may correspond to similar information as the dimensional feature values of the element feature vectors—e.g., the time of day at which a computer file is typically accessed can be compared to the time of day at which the meeting is occurring. It will be understood, however, that the meeting feature vector may take any suitable form, and may differ from the element feature vectors in various suitable ways.

Figure 11A:
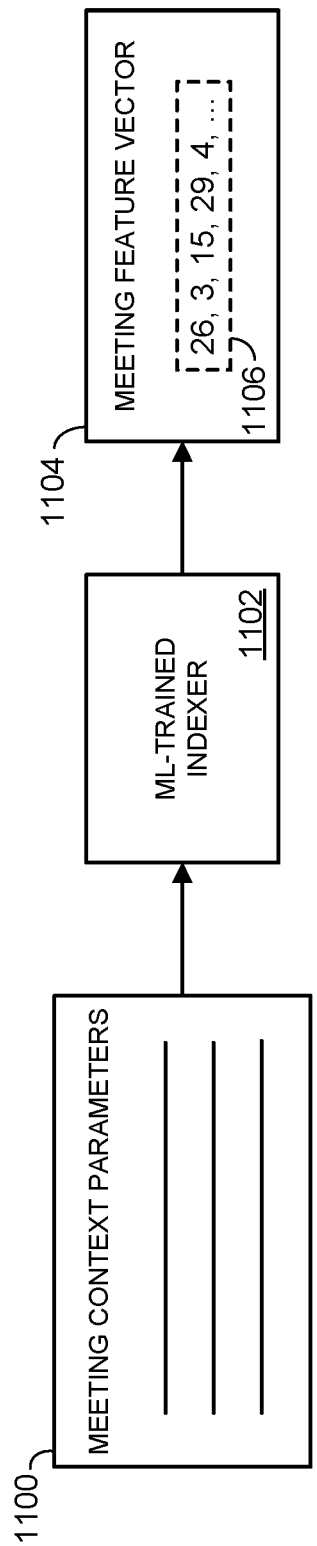
FIGS. 11A and 11B schematically illustrate computing differences between element feature vectors and a meeting feature vector.
Figure 11B:
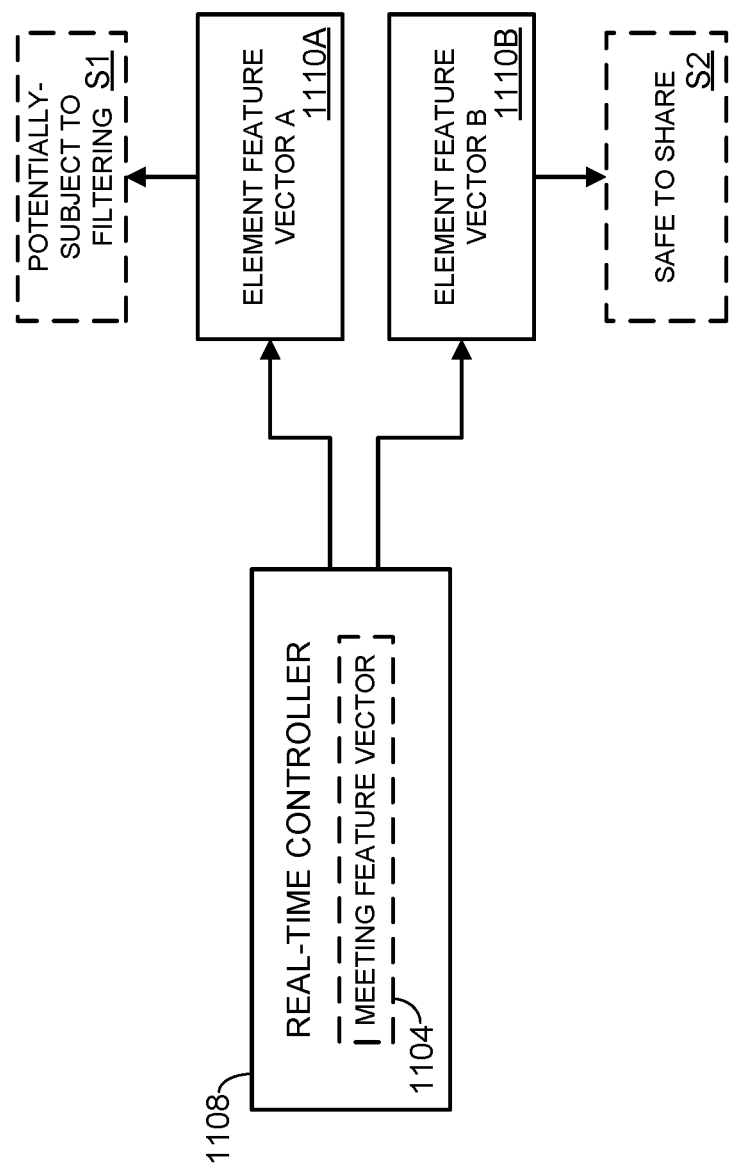

Determining the meeting feature vector is schematically illustrated with respect to FIG. 11A. As shown, for a set of meeting context parameters 1100, an ML-trained indexer 1102 outputs a meeting feature vector 1104, including a plurality of dimensional feature values 1106. As with the dimensional feature values described above with respect to FIG. 5, values 1106 can include negative values and/or non-integer values, in addition to or as an alternative to the positive integers shown in FIG. 11A. Furthermore, the dimensional feature values may be limited to any suitable range. For example, the dimensional feature values can range between 0 and 1, 0 and 100, −1000 and +1000, etc., depending on the implementation.

The meeting context parameters used to determine the meeting feature vector can take various suitable forms. As non-limiting examples, the plurality of meeting context parameters can include one or more of identities of any human participants in the virtual meeting, a time of day at which the virtual meeting is occurring, a topic of the virtual meeting, geographic locations of the client computing device and one or more remote participant devices, and any visual interface content previously shared during the virtual meeting. Such meeting context parameters may be converted into dimensional feature values of the meeting feature vector in a similar manner as was described above with respect to determining element feature vectors for visual content elements. For example, the time of day at which the meeting is occurring can be expressed as a particular value relative to a dimension of the feature space used by the element feature vectors and meeting feature vector. In this manner, element feature vectors having similar values with respect to the particular dimension (e.g., because they correspond to computer files that tend to be accessed at the same time as the meeting is occurring) may be relatively more similar to the meeting feature vector.

It will be understood that, in some cases, the remote meeting server may update the meeting feature vector based on one or more of the plurality of meeting context parameters changing during the virtual meeting. For example, as discussed above, the current set of human participants active in the virtual meeting can be used as a meeting context parameter. As this set of participants changes (e.g., because users join or leave the meeting), the corresponding meeting context parameter, and therefore the corresponding dimensional feature value for the meeting feature vector, may change. Practically, this can create a scenario where a particular visual content element would initially be flagged as potentially subject to filtering (e.g., due to the set of participants initially active in the meeting), but the same visual content element could later be classified as safe for sharing because the group of participants involved in the meeting has changed (and/or any other properties of the virtual meeting have changed).

The meeting feature vector may be updated with any suitable frequency. In some examples, the meeting feature vector may be updated at a set interval (e.g., five minutes). In other examples, the meeting feature vector may only be updated when properties of the virtual meeting change. Still further, in some cases, the meeting feature vector may not be updated while the virtual meeting is ongoing, but rather may stay the same even as properties of the virtual meeting change.

In some cases, the meeting feature vector may be assigned to a vector cluster in a similar manner to the element feature vectors described above. In this manner, any element feature vectors assigned to different vector clusters from the meeting feature vector may automatically be flagged as potentially subject to filtering. It will be understood, however, that the meeting feature vector need not be assigned to any particular vector cluster, and that the remote meeting server need not even be provided with information as to the vector clusters that different element feature vectors are assigned to.

In any case, once the meeting feature vector is determined from the plurality of meeting context parameters, the remote meeting server may, for each visual content element, compute a difference between the element feature vector and a meeting feature vector. This may be done in any suitable way. For example, the remote meeting server may implement a real-time meeting controller, comprising one or more software elements configured to compute vector-to-vector differences between the meeting feature vector and element feature vectors within the feature space. This may include, for example, calculating the Euclidean distance between the meeting feature vector and each element feature vector received from the client computing device. Additionally, or alternatively, any other suitable mathematical approach for computing the relative similarity between two different vectors may be used. This is schematically illustrated with respect to FIG. 11B, in which a real-time meeting controller 1108 compares meeting feature vector 1104 to two different element feature vectors 1110A and 1110B.

Returning briefly to FIG. 10, at 1008, method 1000 includes, based at least in part on determining that the difference between the element feature vector and the meeting feature vector is greater than a content filter threshold, flagging the visual content element as potentially subject to filtering. This is also schematically illustrated with respect to FIG. 11B. Specifically, real-time controller determines that the difference between meeting feature vector 1104 and element feature vector 1110A exceeds a content filter threshold and therefore flags the element feature vector as potentially subject to filtering at S1. By contrast, element feature vector 1110B is determined as being safe to share at S2, based on the difference between the meeting vector and element feature vector 1110B being less than the content filter threshold.

It will be understood that any suitable content filter threshold may be used, depending on the implementation and the specific mathematical technique used to compute the difference between the two respective vectors. In some cases, the content filter threshold may be configurable or adjustable by the human user of the client computing device—e.g., to balance user convenience against the risk that potentially-sensitive content may be inadvertently shared.

Furthermore, as discussed above, the remote meeting server may in some cases maintain more than one filtering threshold. For example, in addition to a content filter threshold used to determine whether a visual content element is potentially subject to filtering, the remote meeting server may maintain an automatic filtering threshold higher than the content filter threshold. Based at least in part on the difference between the element feature vector and the meeting feature vector exceeding the automatic filtering threshold, the corresponding visual content element may be flagged as subject to automatic filtering—e.g., it may be automatically hidden in the shared visual interface content without prompting the human user to confirm whether it should be hidden. It will be understood that any number of different filter thresholds may be used, in addition to or instead of the content filter and automatic filtering thresholds described herein.

Furthermore, any or all filtering thresholds maintained by the remote meeting server may in some cases be updated or changed over time. Returning briefly to FIG. 10, at 1010, method 1000 optionally includes changing the content filter threshold based at least in part on re-training of the ML-trained indexer. For example, the remote meeting server may flag a specified visual content element as potentially subject to filtering. However, when prompted by the client computing device, the human user may choose to share the specified visual content element with other meeting participants. Additionally, or alternatively, a user's decision to manually hide a visual content element that was not flagged can be transmitted to the remote meeting server. Regardless, any user responses received at the remote meeting server can be used as inputs for re-training the ML-trained indexer, which can accordingly increase or decrease any affected content filter thresholds. For example, based on a history of a user manually hiding visual content elements having certain shared properties, the ML-trained indexer may be re-trained in such a way as to cause it to begin flagging such visual content elements (e.g., because they meet a lower threshold for flagging), even if such elements would not have been flagged prior to re-training.

After flagging one or more specified visual content elements, the remote meeting server may then send an indication of the specified visual content elements to the client computing device. From there, the specified visual content elements may in some cases be obscured in the shared visual interface content, as discussed above.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 12:
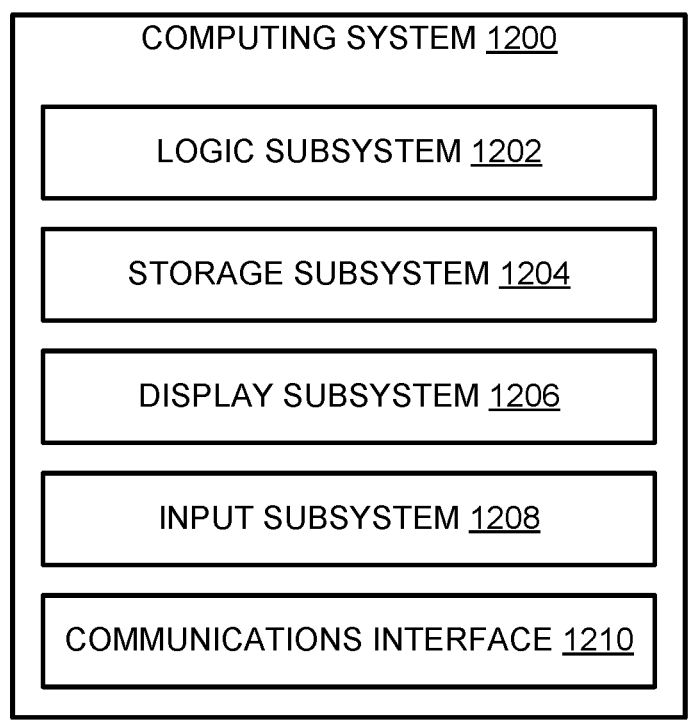
FIG. 12 schematically shows an example computing system.

FIG. 12 schematically shows a simplified representation of a computing system 1200 configured to provide any to all of the compute functionality described herein. Computing system 1200 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1200 includes a logic subsystem 1202 and a storage subsystem 1204. Computing system 1200 may optionally include a display subsystem 1206, input subsystem 1208, communication subsystem 1210, and/or other subsystems not shown in FIG. 12.

Logic subsystem 1202 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1204 includes one or more physical devices configured to temporarily and/or permanently hold computer information such as data and instructions executable by the logic subsystem. When the storage subsystem includes two or more devices, the devices may be collocated and/or remotely located. Storage subsystem 1204 may include volatile, nonvolatile, dynamic, static, read/write, read-only, random-access, sequential-access, location-addressable, file-addressable, and/or content-addressable devices. Storage subsystem 1204 may include removable and/or built-in devices. When the logic subsystem executes instructions, the state of storage subsystem 1204 may be transformed—e.g., to hold different data.

Aspects of logic subsystem 1202 and storage subsystem 1204 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 1206 may be used to present a visual representation of data held by storage subsystem 1204. This visual representation may take the form of a graphical user interface (GUI). Display subsystem 1206 may include one or more display devices utilizing virtually any type of technology. In some implementations, display subsystem may include one or more virtual-, augmented-, or mixed reality displays.

When included, input subsystem 1208 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1210 may be configured to communicatively couple computing system 1200 with one or more other computing devices. Communication subsystem 1210 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for virtual meeting content sharing comprises: during a virtual meeting, at a client computing device, receiving a request to share visual interface content rendered by the client computing device with one or more remote participant devices, the visual interface content including one or more visual content elements; for each of the one or more visual content elements of the shared visual interface content, determining an element feature vector quantifying a plurality of sharing context parameters for the visual content element; sending each of the one or more element feature vectors corresponding to the one or more visual content elements of the shared visual interface content to a remote meeting server; and receiving, from the remote meeting server, an indication that a specified visual content element of the one or more visual content elements is flagged as potentially subject to filtering, based at least in part on a difference between (1) a meeting feature vector and (2) the element feature vector for the specified visual content exceeding a content filter threshold, the meeting feature vector quantifying a plurality of meeting context parameters of the virtual meeting. In this example or any other example, the method further comprises, for the specified visual content element, prompting a human user of the client computing device to confirm whether the specified visual content element should be obscured in the shared visual interface content, and upon user confirmation, obscuring the specified visual content element in the shared visual interface content. In this example or any other example, obscuring the specified visual content element in the shared visual interface content includes blurring the specified visual content element. In this example or any other example, obscuring the specified visual content element in the shared visual interface content includes blacking out the specified visual content element. In this example or any other example, the method further comprises receiving, from the remote meeting server, an indication that a second specified visual content element of the one or more visual content elements is flagged for automatic filtering, based at least in part on a difference between (1) the meeting feature vector and (2) the element feature vector for the second specified visual content exceeding an automatic filtering threshold, higher than the content filter threshold, and automatically obscuring the second specified visual content element in the shared visual interface content. In this example or any other example, the method further comprises automatically obscuring the specified visual content element in the shared visual interface content. In this example or any other example, the one or more element feature vectors corresponding to the one or more visual content elements of the shared visual interface content are assigned by a machine-learning trained indexer, the machine-learning trained indexer previously trained to quantify each of the plurality of sharing context parameters for each visual content element as separate dimensional feature values for each of the one or more element feature vectors relative to a feature space having a plurality of dimensions. In this example or any other example, the machine-learning trained indexer is further configured to assign the one or more element feature vectors to one or more different vector clusters corresponding to one or more different sharing-related virtual domains. In this example or any other example, the machine-learning trained indexer is trained to assign the one or more element feature vectors to one or more different vector clusters via unsupervised training using k-means clustering. In this example or any other example, the machine-learning trained indexer is trained to assign the one or more element feature vectors to one or more different vector clusters via supervised training, based at least in part on inputs from a human user of the client computing device indicating which visual content elements should be filtered in different contexts. In this example or any other example, the method further comprises, based at least in part on obscuring the specified visual content element in the shared visual interface content, automatically obscuring any other visual content elements in the one or more visual content elements assigned to the same sharing-related virtual domain as the specified visual content element. In this example or any other example, the one or more visual content elements of the shared visual interface content include one or more of software application windows, tabs of an internet browser, and displayed notifications. In this example or any other example, the plurality of sharing context parameters for the visual content element include file metadata for a file open in a software application. In this example or any other example, the file metadata include one or more of a date of creation of the file, a number of times the file has previously been read or edited, identities of one or more individuals who have permission to access the file, and an average length of time the file is open. In this example or any other example, the file metadata includes an indication of one or more geographic locations at which the file has previously been accessed, one or more internet protocol (IP) addresses of computing devices that have previously accessed the file, and an indication of one or more times-of-day at which the file has previously been accessed. In this example or any other example, the plurality of sharing context parameters for the visual content element include one or more text, images, or videos visible in the visual content element.

In an example, a method for virtual meeting content sharing comprises: during a virtual meeting, receiving an indication that a client computing device participating in the virtual meeting has initiated sharing of visual interface content rendered by the client computing device with one or more remote participant devices, the visual interface content including one or more visual content elements; for each of the one or more visual content elements of the shared visual interface content, receiving an element feature vector quantifying a plurality of sharing context parameters for the visual content element, the element feature vector including a plurality of different dimensional feature values corresponding to the plurality of sharing context parameters; for each visual content element, computing a difference between the element feature vector and a meeting feature vector quantifying a plurality of meeting context parameters of the virtual meeting; and based at least in part on determining that the difference between the element feature vector and the meeting feature vector is greater than a content filter threshold, flagging the visual content element as potentially subject to filtering. In this example or any other example, the method further comprises updating the meeting feature vector based on one or more of the plurality of meeting context parameters changing during the virtual meeting. In this example or any other example, the plurality of meeting context parameters include one or more of identities of any human participants in the virtual meeting, a time of day at which the virtual meeting is occurring, a topic of the virtual meeting, geographic locations of the client computing device and one or more remote participant devices, and any visual interface content previously shared during the virtual meeting.

In an example, a computing device comprises: a logic subsystem; and a storage subsystem holding instructions executable by the logic subsystem to: during a virtual meeting, at a client computing device, receive a request to share visual interface content rendered by the client computing device with one or more remote participant devices, the visual interface content including one or more visual content elements; for each of the one or more visual content elements of the shared visual interface content, determine an element feature vector quantifying a plurality of sharing context parameters for the visual content element; send each of the one or more element feature vectors corresponding to the one or more visual content elements of the shared visual interface content to a remote meeting server; and receive, from the remote meeting server, an indication that a specified visual content element of the one or more visual content elements is flagged as potentially subject to filtering, based at least in part on a difference between (1) a meeting feature vector and (2) the element feature vector for the specified visual content exceeding a content filter threshold, the meeting feature vector quantifying a plurality of meeting context parameters of the virtual meeting.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for virtual meeting content sharing, the method comprising:
   during a virtual meeting, at a client computing device, receiving a request to share visual interface content rendered by the client computing device with one or more remote participant devices, the visual interface content including one or more visual content elements;
   for the one or more visual content elements of the shared visual interface content, determining one or more element feature vectors corresponding to the one or more visual content elements, the one or more element feature vectors quantifying a plurality of sharing context parameters for the one or more visual content elements, and the one or more element feature vectors assigned by a machine-learning trained indexer having been previously-trained to quantify the plurality of sharing context parameters as separate dimensional feature values relative to a feature space having a plurality of dimensions;
   sending the one or more element feature vectors to a remote meeting server; and
   receiving, from the remote meeting server, an indication that a specified visual content element of the one or more visual content elements is flagged as potentially subject to filtering, based at least in part on a difference between (1) a meeting feature vector and (2) an element feature vector corresponding to the specified visual content exceeding a content filter threshold, the meeting feature vector quantifying a plurality of meeting context parameters of the virtual meeting.

2. The method of claim 1, further comprising, for the specified visual content element, prompting a human user of the client computing device to confirm whether the specified visual content element should be obscured in the shared visual interface content, and upon user confirmation, obscuring the specified visual content element in the shared visual interface content.

3. The method of claim 2, wherein obscuring the specified visual content element in the shared visual interface content includes blurring the specified visual content element.

4. The method of claim 2, wherein obscuring the specified visual content element in the shared visual interface content includes blacking out the specified visual content element.

5. The method of claim 2, further comprising receiving, from the remote meeting server, an indication that a second specified visual content element of the one or more visual content elements is flagged for automatic filtering, based at least in part on a difference between (1) the meeting feature vector and (2) a second element feature vector corresponding to the second specified visual content exceeding an automatic filtering threshold, higher than the content filter threshold, and automatically obscuring the second specified visual content element in the shared visual interface content.

6. The method of claim 1, further comprising automatically obscuring the specified visual content element in the shared visual interface content.

7. The method of claim 1, wherein the machine-learning trained indexer is further configured to assign the one or more element feature vectors to one or more different vector clusters corresponding to one or more different sharing-related virtual domains.

8. The method of claim 7, wherein the machine-learning trained indexer is trained to assign the one or more element feature vectors to one or more different vector clusters via unsupervised training using k-means clustering.

9. The method of claim 7, wherein the machine-learning trained indexer is trained to assign the one or more element feature vectors to one or more different vector clusters via supervised training, based at least in part on inputs from a human user of the client computing device indicating which visual content elements should be filtered in different contexts.

10. The method of claim 7, further comprising, based at least in part on obscuring the specified visual content element in the shared visual interface content, automatically obscuring any other visual content elements in the one or more visual content elements assigned to the same sharing-related virtual domain as the specified visual content element.

11. The method of claim 1, wherein the one or more visual content elements of the shared visual interface content include one or more of software application windows, tabs of an internet browser, and displayed notifications.

12. The method of claim 1, wherein the plurality of sharing context parameters include file metadata for a file open in a software application.

13. The method of claim 12, wherein the file metadata include one or more of a date of creation of the file, a number of times the file has previously been read or edited, identities of one or more individuals who have permission to access the file, and an average length of time the file is open.

14. The method of claim 12, wherein the file metadata includes an indication of one or more geographic locations at which the file has previously been accessed, one or more internet protocol (IP) addresses of computing devices that have previously accessed the file, and an indication of one or more times-of-day at which the file has previously been accessed.

15. The method of claim 1, wherein the plurality of sharing context parameters include one or more of visible text, images, or videos.

16. A method for virtual meeting content sharing, the method comprising:
- during a virtual meeting, receiving an indication that a client computing device participating in the virtual meeting has initiated sharing of visual interface content rendered by the client computing device with one or more remote participant devices, the visual interface content including one or more visual content elements;
- for the one or more visual content elements of the shared visual interface content, receiving one or more element feature vectors corresponding to the one or more visual content elements, the one or more element feature vectors quantifying a plurality of sharing context parameters for the one or more visual content elements, the one or more element feature vectors including a plurality of different dimensional feature values corresponding to the plurality of sharing context parameters;
- for each of the one or more element feature vectors, computing a difference with a meeting feature vector quantifying a plurality of meeting context parameters of the virtual meeting;
- based at least in part on determining that the difference between a particular element feature vector of the one or more element feature vectors and the meeting feature vector is greater than a content filter threshold, flagging a specified visual content element of the one or more visual content elements that corresponds to the particular element feature vector as potentially subject to filtering; and
- flagging a second specified visual content element of the one or more visual content elements for automatic filtering, based at least in part on a difference between (1) the meeting feature vector and (2) a second element feature vector corresponding to the second specified visual content element exceeding an automatic filtering threshold, higher than the content filter threshold.

17. The method of claim 16, further comprising updating the meeting feature vector based on one or more of the plurality of meeting context parameters changing during the virtual meeting.

18. The method of claim 16, wherein the plurality of meeting context parameters include one or more of identities of any human participants in the virtual meeting, a time of day at which the virtual meeting is occurring, a topic of the virtual meeting, geographic locations of the client computing device and one or more remote participant devices, and any visual interface content previously shared during the virtual meeting.

19. A computing device, comprising:
- a logic subsystem including at least one processor; and
- a storage subsystem including at least one memory device holding instructions executable by the logic subsystem to:
  - during a virtual meeting, receive a request to share interface content with one or more remote participant devices, the visual interface content including one or more usual content elements;
  - for the one or more visual content elements of the shared visual interface content, determine one or more element feature vectors corresponding to the one or more visual content elements, the one or more element feature vectors quantifying a plurality of sharing context parameters for the one or more visual content elements, and the one or more element feature vectors assigned by a machine-leaning trained indexer having been previously-trained to quantify the plurality of sharing context parameters as separate dimensional feature values relative to a feature space having a plurality of dimensions;
  - send the one or more element feature vectors to a remote meeting server; and
  - receive, from the remote meeting server, an indication that a specified visual content element of the one or more visual content elements is flagged as potentially subject to filtering, based at least in part on a difference between (1) a meeting feature vector and (2) an element feature vector corresponding to the specified visual content exceeding a content filter threshold, the meeting feature vector quantifying a plurality of meeting context parameters of the virtual meeting.

* * * * *